(12) United States Patent
Yu

(10) Patent No.: US 6,707,385 B2
(45) Date of Patent: Mar. 16, 2004

(54) DC MOTOR ROTATION SPEED ALARM CIRCUITRY

(75) Inventor: Shou-Te Yu, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 0 days.

(21) Appl. No.: 10/242,359

(22) Filed: Sep. 13, 2002

(65) Prior Publication Data

US 2004/0008118 A1 Jan. 15, 2004

(30) Foreign Application Priority Data

Jul. 9, 2002 (TW) ...................................... 91210419 U

(51) Int. Cl.[7] ................................................ G05F 1/10
(52) U.S. Cl. ........................ 340/648; 324/166; 415/118; 388/806; 318/808
(58) Field of Search ................................ 340/648, 661; 415/118; 417/63; 388/806, 908, 909; 318/146, 147, 812, 806; 361/236; 324/166; 310/68 B

(56) References Cited

U.S. PATENT DOCUMENTS 4,028,686 A * 6/1977 Wilson et al. ......... 340/870.31

* cited by examiner

Primary Examiner—Jeffery Hofsass
Assistant Examiner—Jennifer Stone
(74) Attorney, Agent, or Firm—Birch, Stewart, Kolasch & Birch, LLP

(57) ABSTRACT

DC motor rotation speed alarm circuitry includes an input node, a connection node, a ground node, a comparison circuit and a signal generator. When the rotation speed of the DC motor changes during operation, floating voltage is generated between the driving circuit and the ground node. If the floating voltage is less than a preset voltage of the comparison circuit, the alarm signal outputted by the signal generator indicates that the DC motor is operating normally. If the floating voltage is greater than the preset voltage of the comparison circuit, the alarm signal outputted by the signal generator indicates that the DC motor is operating abnormally.

17 Claims, 5 Drawing Sheets

DC MOTOR ROTATION SPEED ALARM CIRCUITRY

FIELD OF THE INVENTION

The invention relates to DC motor rotation speed alarm circuitry, and more particularly, to alarm circuitry that is able to accurately display alarm signals even if the rotation speed of the motor changes.

BACKGROUND OF THE INVENTION

In modern society, a great amount of electronic data is broadcasted and processed so that information and knowledge are exchanged rapidly. Technological developments accelerate at a faster pace, and people's lives are greatly enriched. Take notebook computers for instance. When processing a large amount of data, the central processing unit becomes overheated. Hence the notebook computer usually has a control circuit to modulate the operating speed of the radiator to resolve the heat dissipation problem, and alarm circuitry to feed back alarm signals to the computer system to indicate whether the computer system is functioning properly.

Refer to FIGS. 1 and 2 for the heat dissipation procedures of a conventional radiator 10 for a central processing unit (CPU) 12, and a simple circuit diagram of the driving circuit 16 and the alarm circuit 20 shown in FIG. 1. As shown in FIG. 1, the radiator 10 includes a DC motor 14, a driving circuit 16 electrically connected to the DC motor 14, and a radiation fan 18 electrically connected to the DC motor 14. When the radiator 10 performs a heat dissipation procedure to the CPU 12, the driving circuit 16 first transmits a rotation signal to control the rotation of the DC motor 14. The rotation signal is usually a current signal. Then the radiation fan 18 is driven to rotate by the DC motor 14 to perform heat dissipation processes to the CPU 12. Finally, the CPU 12 feeds back signals indicating the result and operating conditions of the heat dissipation procedure, and also whether to modulate the rotation speed of the DC motor 14 to the driving circuit 16. The alarm circuit 20 receives the operating conditions of the CPU 12 transmitted from the driving circuit 16, and outputs an alarm signal to the computer system (not shown in the drawings).

Referring to FIG. 2, the driving circuit 16 includes an n-p-n bipolar junction transistor (BJT) functioning as a switch component 17, which has an emitter connected to the ground GND and a collector electrically connected to the alarm circuit 20. The alarm circuit 20 is connected to a constant voltage power supply Vcc2. In addition, the driving circuit 16 has one node connected to a voltage power supply Vcc1 with a voltage greater than or equal to the voltage of Vcc2.

In order to facilitate description of the operating principle of the alarm circuit 20, the alarm signals described below are represented by digital signals '0' and '1'. '0' indicates that the CPU 12 is in a normal operating condition while '1' indicates that the CPU 12 is not operating or is operating abnormally. Another assumption is that the voltage of the first voltage power supply Vcc1 is 12 V (Volts) while the voltage of the second voltage power supply Vcc2 is 6 V.

When the CPU 12 is in a normal operating condition, the DC motor 14 maintains a selected rotation speed, and the current generated by the voltage power supply Vcc1 passes through the switch component 17 and flows to the ground node G through the emitter of the n-p-n BJT 17. In such a condition, there is no electric potential difference between the emitter of the BJT 17 and the ground GND. Hence the voltage received by the alarm circuit 20 is approximately 0 V, and the indication of the alarm signal output by the alarm circuit 20 is '0'. This means that the CPU 12 is functioning normally. When the CPU 12 is not functioning, the DC motor 14 does not rotate. The first voltage power supply Vcc1 does not provide power to the switch component 17 (i.e. the BJT 17 does not conduct electrically). The voltage received by the alarm circuit 20 is 6 V (i.e. the voltage provided by the second voltage power supply Vcc2). Then the alarm signal outputted by the alarm circuit 20 indicates '1', meaning that the CPU 12 is not functioning or is functioning improperly.

When data processing volume in the CPU 12 increases, the driving circuit 16 accelerates the rotation speed of the DC motor 14. In such a condition, there is a floating voltage between the driving circuit 16 and the ground GND (i.e. the transistor 17 and the ground GND). The faster the DC motor 14 rotates, the greater the floating voltage becomes. Assuming that the rotation speed of the DC motor 14 increases to a preset level and the floating voltage between the driving circuit 16 and the ground GND is 3 V, the voltage received by the alarm circuit 20 is 3 V. In such a condition, the alarm circuit 20 cannot output the correct alarm signals. When the floating voltage is 6 V (i.e. same as the voltage of the second voltage power supply Vcc2), the alarm signal outputted by the alarm circuit 20 indicates '1'. However, the overall computer system is in fact in a normal operating condition, but is processing or transmitting a large amount of data. Therefore, the system could mistakenly judge the situation and cause a system shutdown because of the error signals.

SUMMARY OF THE INVENTION

The object of the invention is therefore to provide DC motor rotation speed alarm circuitry that is simply designed with a smaller number of electronic components and can accurately display alarm signals for motor operating conditions even if the rotation speed of the motor has changed, thus enabling the whole system to maintain normal operation.

The foregoing, as well as additional objects, features and advantages of the invention will be more readily apparent from the following detailed description, which proceeds with reference to the accompanying drawings.

DESCRIPTION OF THE PREFERRED EMBODIMENTS

Figure 1:
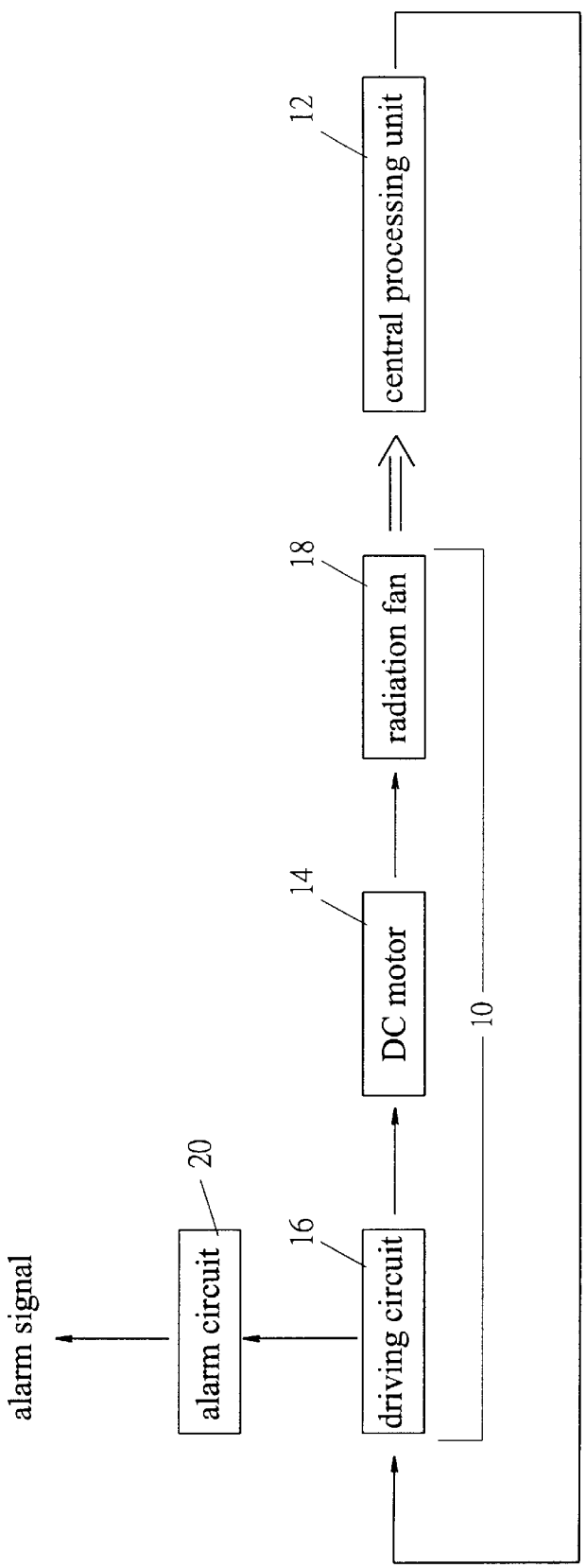
FIG. 1 is a schematic functional block diagram of a radiator processing, heat dissipation for a CPU according to the prior art.
Figure 2:
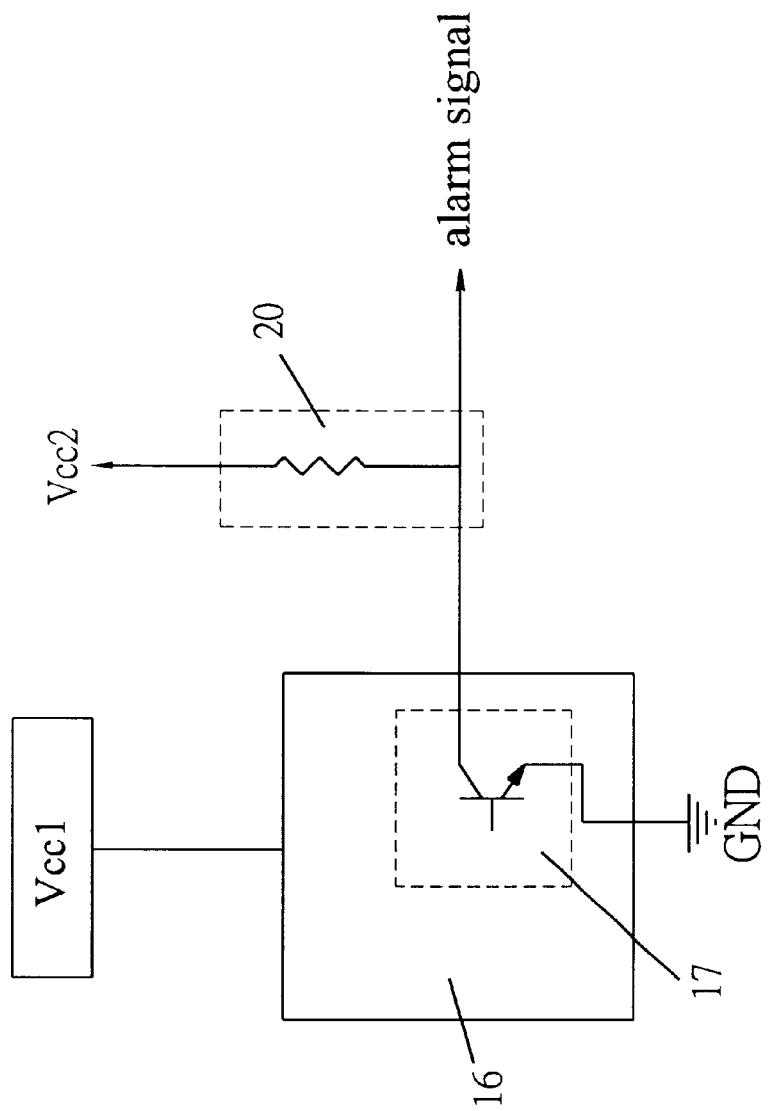
FIG. 2 is a schematic circuit diagram of a driving circuit and an alarm circuit depicted in FIG. 1.
Figure 3:
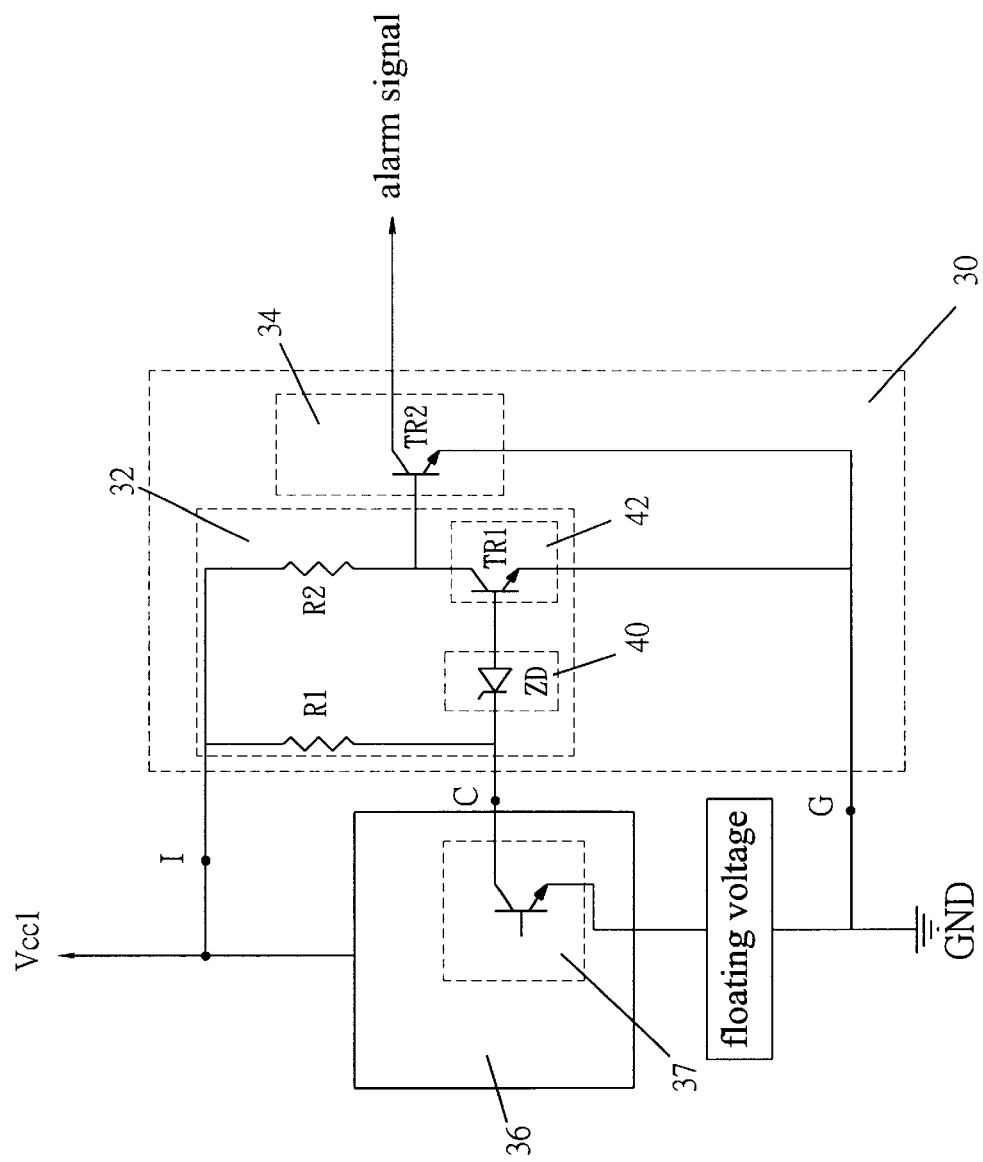
FIG. 3 is a circuit diagram of an alarm circuit adopted on a driving circuit according to the first preferred embodiment of the present invention.

Refer to FIG. 3 of a first embodiment of the alarm circuit 30 adopted on a driving circuit 36. The driving circuit 36 connected to a DC motor (not shown in the drawing) includes an n-p-n BJT 37 functioning as a switch component 37, which has an emitter connected to the ground GND and a collector electrically connected to the alarm circuit 30. In addition, the driving circuit 36 has one node connected to a voltage power supply Vcc1 that has a preset voltage. As shown in FIG. 3, the alarm circuit 30 has an input node I jointly connected to the voltage power supply Vcc1 with the driving circuit 36, a connection node C electrically connected to the driving circuit 36, and a ground node G jointly connected to the ground GND with the driving circuit 36. The alarm circuit 30 further includes a comparison circuit 32 respectively connected to the input node I, the connection node C and the ground node G, and a signal generator 34 electrically connected to the comparison circuit 32 and the ground node G so as to output an alarm signal. Furthermore, the comparison circuit 32 includes a voltage reference component 40 electrically connected to the driving circuit 36 and the input node I, and a switch component 42 electrically connected to the voltage reference component 40.

In the first embodiment set forth above, the voltage reference component 40 of the comparison circuit 32 is a Zener diode ZD for providing a reference voltage Vzd smaller than the preset voltage of the voltage power supply Vcc1. There is a voltage reducing resistor R1 located between the negative pole of the Zener diode ZD and the input node for generating a voltage drop when the current provided by the voltage power supply Vcc1 runs through. Moreover, the switch component 42 of the comparison circuit 32 composed of an n-p-n BJT TR1 is used to control on/off of the voltage reference component 40. The base pole of the BJT TR1 electrically connects to the voltage reference component 40, and the collector and the emitter of the BJT TR1 respectively connect to the input node I and the ground node G. When the switch component 42 conducts, current generated by the voltage power supply Vcc1 runs respectively through the Zener diode ZD and the emitter of the n-p-n BJT TR1 to the ground GND. In addition, the comparison circuit 32 further includes a voltage reducing resistor R2, which has two ends respectively connected to the input end 1 and the collector of the transistor TR1 so that when the voltage reference component 40 does not conduct there is still a voltage drop between the input node I and the transistor TR1 to form an electric pathway.

The signal generator 34 in this embodiment is an n-p-n BJT Tr2 with a base pole connected between the switch component 42 of the comparison circuit 32 and the resistor R2. Its emitter is jointly connected to the ground node G with the emitter of the switch component 42, and its collector serves as a signal output node to output the alarm signal of the alarm circuit 30.

In order to facilitate the description of the operating principle of the alarm circuit of the invention, the alarm signals described below are represented by digital signals '0' and '1'. When the DC motor maintains a preset rotation speed, the output current from the voltage power supply Vcc1 runs through the driving circuit 36 to the ground GND). As there is no electric potential difference between the switch component 37 and the ground GND, the voltage at the connection node C of the alarm circuit 30 is 0 V. In such a condition, the Zener diode ZD is not in a conducting state. Outputted current from the voltage power supply Vcc1 runs through the resistor R2 and the emitter of the transistor Tr2 to the ground node G. Therefore, the signal generator 34 of the alarm circuit 30 outputs an alarm signal '0', which indicates that the DC motor is in a normal operating condition.

When the rotation speed of the DC motor changes, a floating voltage is generated between the driving circuit 36 and the ground node G. Meanwhile the connection node C of the alarm circuit 30 has the same voltage level as the floating voltage. It is to be noted that the reference voltage Vzd of the voltage reference component 40 of the comparison circuit 32 in this embodiment is slightly less than the voltage power supply Vcc1. That is, when the floating voltage reaches the reference voltage Vzd of the voltage reference component 40, the rotation speed of the DC motor reaches the rotation limit set by the system. Hence, when the rotation speed of the DC motor changes, if the floating voltage is smaller than the reference voltage Vzd, and the Zener diode ZD is at non-conducting state, the current outputted by the voltage power supply Vcc1 runs through the resistor R2 and the emitter of the transistor Tr2 to the ground node G. Thus the alarm signal generated by the signal generator 34 is '0', which indicates that the DC motor is operating normally.

In the event that the floating voltage is greater than the reference voltage Vzd (i.e., the rotation speed of the DC motor exceeds the limit value preset by the system), the current outputted by the voltage power supply Vcc1 runs through the input node I, the resistor R1, the Zener diode ZD and the input node I, the resistor R2 and the collector of the transistor TR1 to the emitter of the transistor TR1, then flows to the ground node G. Hence, the current signal output from the emitter of the transistor TR2 is '0', and the signal output from the collector of the transistor TR2 is '1'. This means that the alarm signal generated by the signal generator 34 of the driving circuit 30 is '1', which indicates that the DC motor is not operating or is operating abnormally. By means of the first embodiment set forth above, the alarm circuit 30 can correctly display alarm signals to indicate the operating conditions of the DC motor without being affected by the floating voltage.

Figure 4:
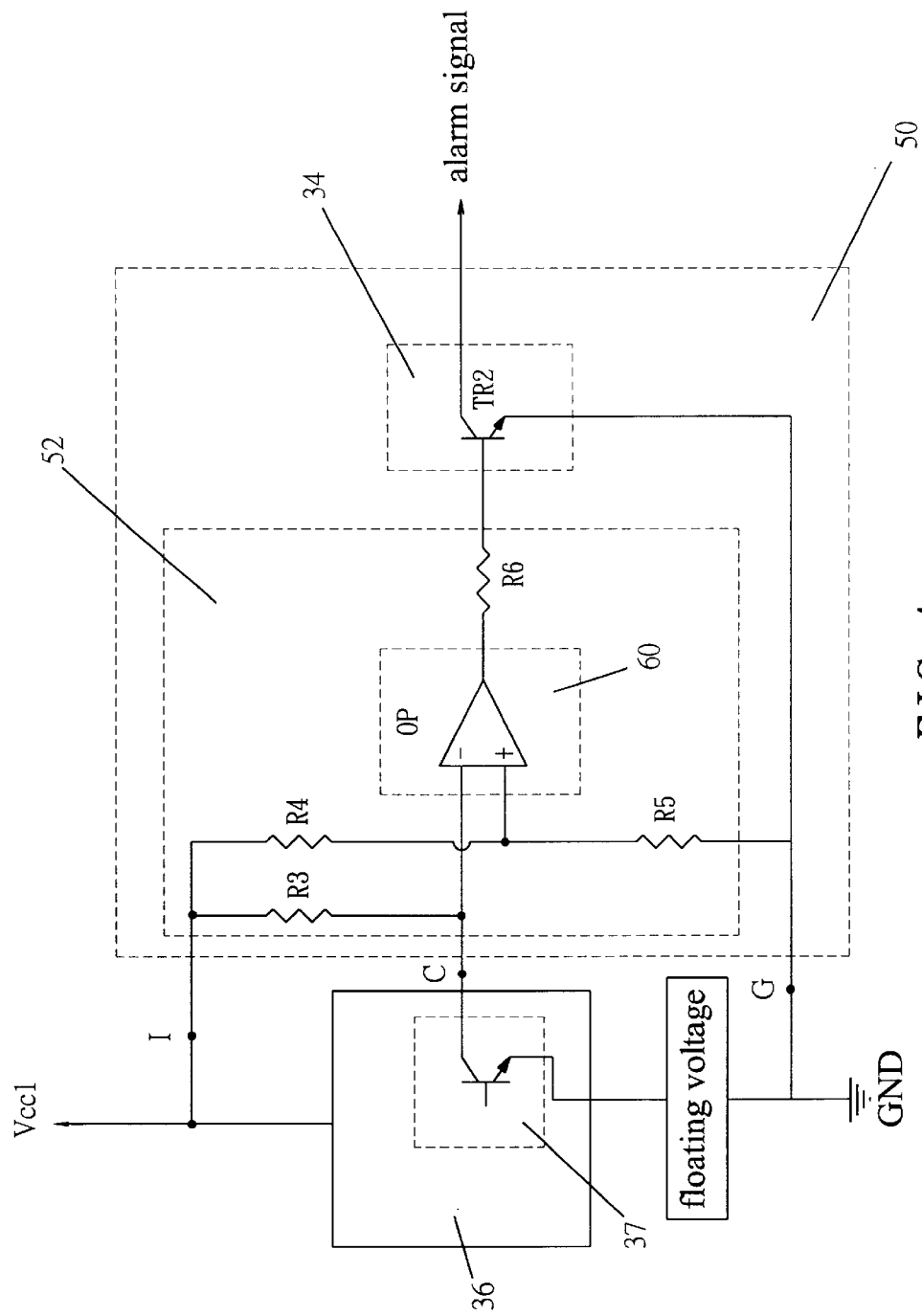
FIG. 4 is a circuit diagram of an alarm circuit adopted on the driving circuit according to the second preferred embodiment of the present invention.

Refer to FIG. 4 of a second embodiment of an alarm circuit 50 of the invention adopted on the driving circuit 36. The circuit layout and configuration of the driving circuit 36 of this embodiment is substantially the same as that of the first embodiment, thus details are omitted. As shown in FIG. 4, the alarm circuit 50 also includes an input node I connected to the voltage power supply Vcc1 with the driving circuit 36, a connection node C electrically connected to the driving circuit 36, a ground node G jointly connected to the ground GND with the driving circuit 36, a comparison circuit 52 respectively connected to the input node I, the connection node C and the ground node G, and a signal generator 34 electrically connected to the comparison circuit 52 and the ground node G for outputting an alarm signal. The structure and functions of the signal generator 34 have been explained in the first embodiment, thus are omitted here. In addition, the comparison circuit 52 includes a voltage reference component 60 electrically connected to the driving circuit 36 and the input node I.

In the second embodiment, the voltage reference component 60 of the comparison circuit 52 is an OP amplifier for providing voltage comparison. The inverse phase input node of the OP amplifier electrically connects to the connection node C of the comparison circuit 52, and the non-inverse input node and output node of the OP amplifier connect to the ground node G of the comparison circuit 52 and the signal generator 34, respectively. In addition, the comparison circuit 52 further includes a voltage reducing resistor R3, a current-limited resistor R6 and two matching resistors R4 and R5. The resistor R3 is located between the input node I and the connection node C for generating a voltage drop when the outputted current generated from the voltage power supply Vcc1 runs through so as to form an electric pathway. The resistor R4 is located between the output node of the OP amplifier and the transistor TR2 of the signal generator 34 to reduce the current flowing into the OP amplifier and the transistor TR2 so as to protect the OP amplifier and the signal generator 34. The matching transistors R4 and R5 have one end respectively connected to the input node I and the ground node G, and the other end jointly connected to the non-inverse phase input node of the OP amplifier. It is to be noted that the resistance of the resistor R5 is much greater than that of resistor R4. In other words, when the outputted current of the voltage power supply Vcc1 runs through the resistors R4 and R5, the voltage at the non-inverse phase input node of the OP amplifier (i.e. the electric potential difference at two ends of the resistor R5) is only slightly less than the voltage of the voltage power supply Vcc1.

When the rotation speed of the DC motor changes, a floating voltage is generated between the driving circuit 36 and the ground node G. In normal conditions, the floating voltage is less than the voltage at the non-inverse phase input node of the OP amplifier (only slightly less than the voltage power supply Vcc1). Hence the OP amplifier is in a conducting state. The outputted current of the voltage power supply Vcc1 runs through the resistors R3 and R4, OP amplifier, resistor R6, and the emitter of the transistor TR2 to the ground node G. The alarm signal generated by the signal generator 34 is '0', which indicates that the DC motor is operating normally.

Figure 5:
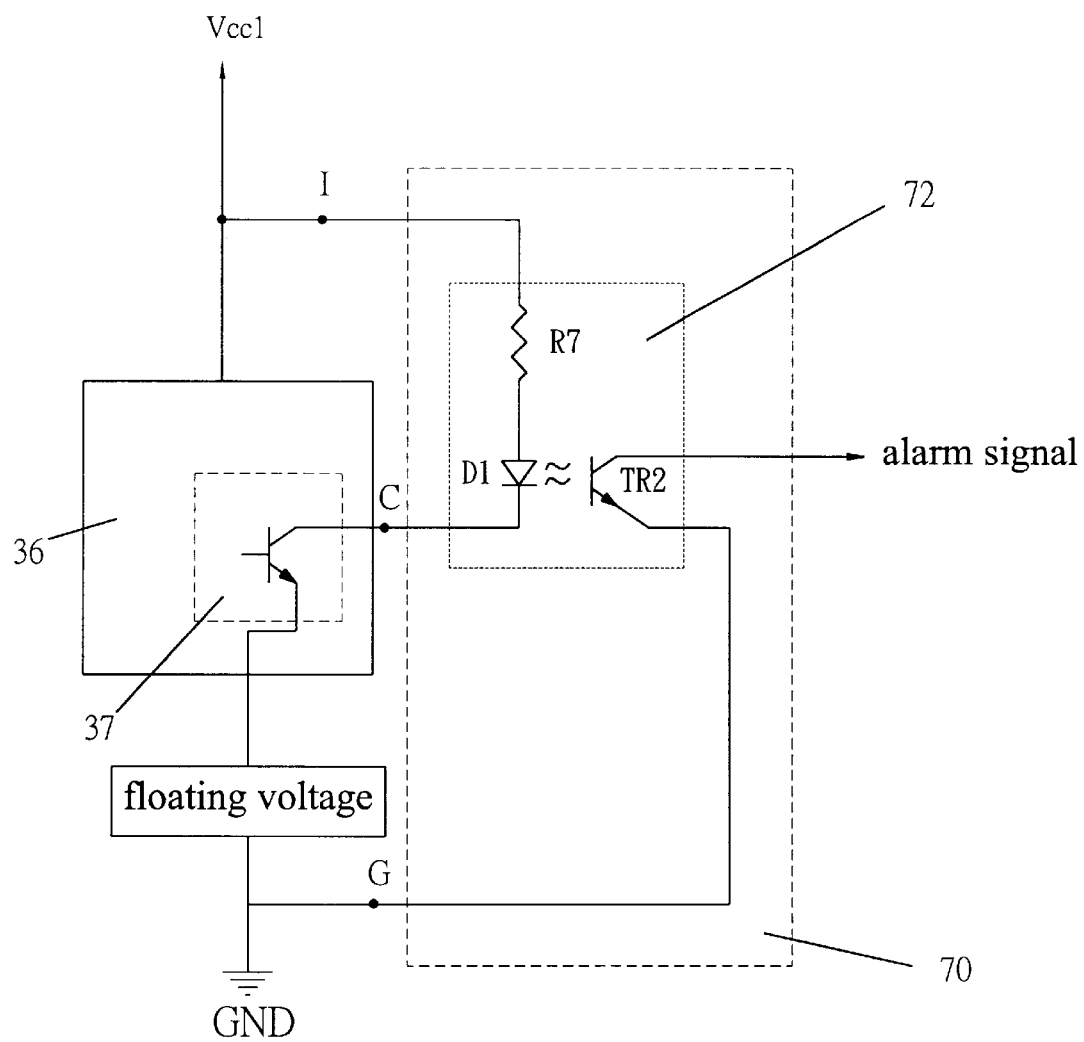
FIG. 5 is a circuit diagram of an alarm circuit 70 adopted on the driving circuit according to the third preferred embodiment of the present invention.

In the event that the floating voltage is greater than the voltage at the non-inverse phase input node of the OP amplifier, or the voltage at the inverse phase input node of the OP amplifier is greater than the voltage at the non-inverse phase input node, this indicates that the rotation speed of the DC motor has exceeded the limit value preset by the system. In such a condition, the OP amplifier becomes a break. The outputted current of the voltage power supply Vcc1 runs through the input node I, resistor R4, and resistor R5 to the ground node G. Therefore, the current signal flowing out of the emitter of the transistor TR2 is '0' and the signal outputted from the collector of the transistor TR2 is '1'. This means that the signal generated by the signal generator 34 of the alarm circuit 30 is '1', which indicates that the DC motor is not operating or is operating abnormally condition. Thus, by means of the second embodiment set forth above, the alarm circuit 50 can correctly display alarm signals to indicate the operating conditions of the DC motor without being affected by the floating voltage. Refer to FIG. 5 of a third embodiment of an alarm circuit 70 of the invention adopted on the driving circuit 36. The circuit layout and configuration of the driving circuit 36 of this embodiment is substantially the same as that of the first and the second embodiments, thus details are omitted. As shown in FIG. 5, the alarm circuit 70 also includes an input node I connected to the voltage power supply Vcc1 with the driving circuit 36, a connection node C electrically connected to the driving circuit 36, a ground node G connected to the ground GND with the driving circuit 36, and a signal output circuit 72 electrically connected to the input node I, the connection node C and the ground node G for outputting an alarm signal. The signal output circuit 72 includes a photo diode D1 electrically connected between the input node I and the driving circuit 36 for generating photo current when the current outputted from the voltage power supply Vcc1 runs through, a photo receiver composed of an n-p-n BJT TR2 to receive the photo current generated by the photo diode D1 and output a corresponding alarm signal, and a voltage reducing resistor R7 located between the input node I and the photo diode D1 for generating a voltage drop when the outputted current generated from the voltage power supply Vcc1 runs through.

As in the first and the second embodiments, when the rotation speed of the DC motor changes, a floating voltage is generated between the driving circuit 36 and the ground node G. In normal conditions, the floating voltage is always less than the preset voltage value of the voltage power supply Vcc1. Hence the photo diode D1 is in a conducting state. The photo receiver (or transistor) TR2 receives the photo current generated by the photo diode D1. Outputted current from the voltage power supply Vcc1 runs through the resistor R7, photo diode D1, and the emitter of the transistor TR2 to the ground node G. Hence, the alarm signal generated by the signal output circuit 72 is '0', which indicates that the DC motor is operating normally.

In the event that the floating voltage is greater than the voltage of the voltage power supply Vcc1, the rotation speed of the DC motor has exceeded the limit value preset by the system. In such a condition, the photo diode D1 becomes a break. The transistor TR2 cannot receive the photo current generated by the photo diode D1. Therefore, the current signal flowing out of the emitter of the transistor TR2 is '0' and the signal outputted from the collector of the transistor TR2 is '1'. This means that the signal generated by the signal output circuit 72 of the alarm circuit 70 is '1', which indicates that the DC motor is not operating or is operating abnormally . Thus, by means of the third embodiment set forth above, the alarm circuit 70 can correctly display alarm signals to indicate the operating conditions of the DC motor without being affected by the floating voltage.

It is to be noted that the driving circuit 36 in the various embodiments set forth above may also be a driver IC and be built in the DC motor to drive the motor to rotate.

Compared with the prior art, the biggest difference of the present invention is that the alarm circuits 30, 50 and 70 for the DC motor rotation speed alarm include only simple circuit components, and can accurately output alarm signals while the DC motor operates, even if the rotation speed of the motor changes. The alarm signal is not affected by floating voltages. Therefore, the total system can maintain a normal operating condition.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A simple alarm circuitry connected to a driving circuit of a DC motor for outputting a motor rotation speed alarm signal, comprising:

an input node jointly connected to a preset voltage power supply with the driving circuit of the DC motor;

a connection node electrically connected to the driving circuit of the DC motor;

a ground node jointly connected to the ground with the driving circuit of the DC motor;

a comparison circuit electrically and respectively connected to the input node, the connection node and the ground node to provide a preset voltage smaller than the voltage power supply; and a signal generator connecting electrically between the comparison circuit and the ground node to output the alarm signal;

wherein a floating voltage is generated between the driving circuit and the ground node when the rotation speed of the DC motor changes during operation, the signal generator outputting the alarm signal to indicate the DC motor operated in a normal operating condition when the floating voltage is smaller than the preset voltage of the comparison circuit; the signal generator outputting the alarm signal to indicate the DC motor operated in an abnormal operating condition when the floating voltage is greater than the preset voltage of the comparison circuit.

2. The alarm circuitry of claim 1, wherein the comparison circuit comprises:
   a voltage reference component electrically connected to the driving circuit and the input node of the alarm circuitry to provide the preset voltage of the comparison circuit; and
   a switch component electrically connected to the voltage reference component for controlling conduction of the voltage reference component.

3. The alarm circuitry of claim 2, wherein the voltage reference component is a Zener diode.

4. The alarm circuitry of claim 3, wherein the comparison circuit further includes a first resistor and a second resistor that have one end respectively connected to the Zener diode and the switch component, and the other end jointly connected to the input node to generate two voltage drops when electric current runs therethrough.

5. The alarm circuitry of claim 2, wherein the switch component is an n-p-n bipolar junction transistor (BJT).

6. The alarm circuitry of claim 1, wherein the signal generator is an n-p-n bipolar junction transistor (BJT).

7. The alarm circuitry of claim 1, wherein the driving circuit is a driver integrated circuit (IC).

8. The alarm circuitry of claim 2, wherein the voltage reference component is an OP amplifier.

9. The alarm circuitry of claim 8, wherein the OP amplifier has an inverse phase input node, a non-inverse input node and an output node connected to the connection node, the ground node and the switch element, respectively.

10. The alarm circuitry of claim 8, wherein the OP amplifier further includes a current-limited resistor located between the output node and the switch element for reducing the current running through the OP amplifier to protect the OP amplifier and the switch component.

11. The alarm circuitry of claim 9, wherein the comparison circuit further includes a third resistor located between the connection node and the input node to generate a voltage drop when the current runs through.

12. The alarm circuitry of claim 9, wherein the comparison circuit further includes a fourth resistor and a fifth resistor that have one end respectively connected to the non-inverse phase input node of the OP amplifier, the resistance of the fifth resistor being greater than the resistance of the fourth resistor.

13. A simple alarm circuitry connected to a driving circuit of a DC motor for outputting a motor rotation speed alarm signal, comprising:
   an input node jointly connected to a preset voltage power supply with the driving circuit of the DC motor;
   a connection node electrically connected to the driving circuit of the DC motor,
   a ground node jointly connected to the ground with the driving circuit of the DC motor; and
   a signal output circuit electrically and respectively connected to the input node, the connection node and the ground node to output the alarm signal;
   wherein a floating voltage is generated between the driving circuit and the ground node when the rotation speed of the DC motor changes during operation, the signal output circuit outputting the alarm signal to indicate the DC motor operated in a normal condition without affected by the floating voltage when the floating voltage is smaller than the preset voltage of the voltage power supply.

14. The alarm circuit of claim 13, wherein the signal output circuit comprises:
   a photo diode electrically connected to the driving circuit and the input node of the alarm circuitry to generate a photo current when current outputted by the voltage power supply runs through; and
   a photo receiver for receiving the photo current generated by the photo diode and outputting the alarm signal.

15. The alarm circuit of claim 14, wherein the signal output circuit further includes a resistor located between the input node of the alarm circuitry and the photo diode to generate a voltage drop when electric current runs through the resistor.

16. The alarm circuitry of claim 14, wherein the photo receiver is an n-p-n bipolar junction transistor (BJT).

17. The alarm circuitry of claim 13, wherein the driving circuit is a driver integrated circuit (IC).

* * * * *